United States Patent
Al-Otaibi et al.

(10) Patent No.: US 11,346,465 B2
(45) Date of Patent: May 31, 2022

(54) FLANGE MANAGEMENT AND SERVICES TOOL

(71) Applicant: SAUDI ARABIAN OIL COMPANY, Dhahran (SA)

(72) Inventors: Abdullah M. Al-Otaibi, Al Khobar (SA); Ridha A. Alhassan, Al-Ahsa (SA); Jalal M. Ramdhan, Al-Ahsa (SA); Ali A. Aliwi, Al-Ahsa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/064,749

(22) Filed: Oct. 7, 2020

(65) Prior Publication Data
US 2022/0107036 A1    Apr. 7, 2022

(51) Int. Cl.
*F16L 23/036* (2006.01)
*F16L 1/10* (2006.01)
*B23P 19/10* (2006.01)

(52) U.S. Cl.
CPC .................. *F16L 1/10* (2013.01); *B23P 19/10* (2013.01)

(58) Field of Classification Search
CPC . F16L 23/02; F16L 23/036; F16L 1/09; F16L 1/10; Y10T 29/53917; B25B 27/14; B25B 27/16
USPC ............ 29/271, 272, 252, 525.02, 464, 467; 285/368, 412
See application file for complete search history.

(56) References Cited

U.S. PATENT DOCUMENTS

| | | | |
|---|---|---|---|
| 4,027,373 A * | 6/1977 | Kwast | F16L 23/006 29/256 |
| 4,872,709 A | 10/1989 | Stack | |
| 5,226,231 A | 7/1993 | De Leebeeck | |
| 5,228,181 A | 7/1993 | Ingle | |
| 7,703,215 B1 | 4/2010 | Sanchez | |
| 8,266,774 B1 | 9/2012 | Doty | |
| 9,631,750 B1 | 4/2017 | Veazey | |

(Continued)

FOREIGN PATENT DOCUMENTS

| CN | 104589278 B | 1/2017 |
|---|---|---|
| DE | 9103104 U1 | 6/1991 |

(Continued)

OTHER PUBLICATIONS

International Search Report issued in Application No. PCT/US2020/057306, dated Jun. 21, 2021 (6 pages).

(Continued)

*Primary Examiner* — Sunil Singh
(74) *Attorney, Agent, or Firm* — Osha Bergman Watanabe & Burton LLP (57) ABSTRACT

A tool to manage flanges during installation and dismantling of flanges includes a first ring support structure and a second ring support structure spaced apart along a tool axis. First and second mechanical arms are retained on the first and second ring support structures. Each of the mechanical arms has an extendible arm joint that is operable to adjust an axial distance between the first and second ring support structures. A guide shaft is coupled to the first and second ring support structures. The guide shaft is positioned to guide a relative movement between the first and second ring support structures during operation of the extendible arm joints of the first and second mechanical arms.

14 Claims, 9 Drawing Sheets

(56) References Cited

U.S. PATENT DOCUMENTS

| | | |
|---|---|---|
| 2014/0239633 A1 | 8/2014 | Swingley |
| 2015/0174706 A1 | 6/2015 | McClure |
| 2019/0128430 A1 | 5/2019 | Alharbi et al. |

FOREIGN PATENT DOCUMENTS

| | | |
|---|---|---|
| GB | 2198203 A | 6/1988 |
| WO | 2012107766 A1 | 8/2012 |

OTHER PUBLICATIONS

Written Opinion issued in Application No. PCT/US2020/057306, dated Jun. 21, 2021 (9 pages).

\* cited by examiner

FLANGE MANAGEMENT AND SERVICES TOOL

BACKGROUND

Flanges are used in piping systems to connect two pipes together or to connect pipe to equipment. Typically, the flanges are bolted or otherwise fastened together to make the flange connection. Flanges may carry gaskets on their faces to form a seal at the connection. In some cases, safety devices such as line blinds may be inserted between flanges to control flow of material through the piping system.

Due to many factors, misalignment between two flanges may occur during flange installation or while the flanges are in use in a piping system. There are four main types of flange misalignments: angular misalignment, where the flange faces are not parallel to each other; parallel misalignment, where the longitudinal axes of the flanges do not coincide; rotational misalignment, where the bolt holes on one flange are rotated relative to the bolt holes on the other flange; and axial separation, where there is an unwanted axial gap between the flange faces. Extreme misalignments between mating flanges may lead to failure of the flange connection and/or fluid leakage from the flange connection.

Flange alignment tools exist for correcting misalignment in flanges during flange installation. These tools are typically designed to address one type of flange misalignment. However, any combination of the different types of misalignments may be present between any two flanges involved in a flange connection, complicating the process of managing flanges.

A spectacle blind is an example of a safety device that allows isolation of a section of a piping system or equipment in order to enable safe maintenance of the piping section or equipment. The spectacle blind has two discs attached to each other by a web or strip of material. One of the discs is solid or blind and blocks flow through the flange connection. The other disc has an opening to allow flow of material inside the piping system. When the spectacle blind is not being used for isolation, the spectacle blind is oriented such that the disc with the opening is positioned between the flanges. For isolation applications, the spectacle blind is oriented such that the disc without the opening is positioned between the flanges. The spectacle blind is typically mounted between flanges by aligning a hole in the web of the spectacle blind with holes in the flanges, inserting a bolt through the aligned holes, and tightening the bolt. The spectacle blind can be rotated about the bolt to move the spectacle blind between the closed position where there is no flow through of material and the open position where flow through of material is permitted.

In some cases, the spectacle blind may be installed between misaligned flanges. Handling misaligned flanges with a spectacle blind may present high risk because of the possibility of stress build up in the system. The stress may have been built up as a result of system misalignments during the original installation of the flanges and/or as a result of system deformation during operation, such as deformation due to foundation damages or thermal expansion of piping materials. In some cases, a forklift is needed to handle a spectacle blind, for example, if the spectacle blind is too heavy to carry by hand or is installed at a high location. Typical tools for aligning flanges do not help with installation of a spectacle blind or other type of line blind, further complicating the process of managing flanges.

SUMMARY

In a first summary example, an apparatus includes a first ring support structure and a second ring support structure disposed and spaced apart along a tool axis. The apparatus includes a first mechanical arm having a first end retained on the first ring support structure and a second end retained on the second ring support structure. The first mechanical arm has an extendible arm joint that is operable to adjust an axial distance between the first ring support structure and the second ring support structure from a first location. The apparatus includes a second mechanical arm having a first end retained on the first ring support structure and a second end retained on the second ring support structure. The second mechanical arm has an extendible arm joint that is operable to adjust the axial distance between the first ring support structure and the second ring support structure from a second location that is different from the first location. The apparatus includes a guide shaft coupled to the first ring support structure and the second ring support structure. The guide shaft is positioned to guide a relative movement between the first ring support structure and the second ring support structure during operation of the extendible arm joints of the first and second mechanical arms.

The first ring support structure of the apparatus may include a first pipe clamp and a first support collar disposed around the first pipe clamp. The first support collar may include apertures to receive the first ends of the first and second mechanical arms. The second ring support structure of the apparatus may include a second pipe clamp and a second support collar disposed around the second pipe clamp. The second support collar may include apertures to receive the second ends of the first and second mechanical arms.

Each of the extendible arm joints of the first and second mechanical arms of the apparatus may include a linear actuator, which in some cases may be a pneumatic cylinder, a hydraulic cylinder, or a screw jack.

The apparatus may include a tool arm. The guide shaft of the apparatus may be rotatable relative to the first and second support structures, and the tool arm may be coupled to the guide shaft and rotatable with the guide shaft.

The guide shaft of the apparatus may be resiliently coupled to the first ring support structure and the second ring support structure to permit adjustment of an axial position of the guide shaft in response to the relative movement between the first ring support structure and the second ring support structure.

The apparatus may include a plurality of alignment spacers positioned on the mechanical arms and guide shaft. Each alignment spacer may be adjustable in a transverse direction to the tool axis.

In a second summary example, a system includes a first pipe having a first flange and a second pipe having a second flange positioned in opposing relation to the first flange. The system includes a first ring support structure disposed around the first pipe and a second ring support structure disposed around the second pipe. The system includes a first mechanical arm disposed alongside the first and second flanges. The first mechanical arm has a first end retained on the first ring support structure and a second end retained on the second ring support structure. The first mechanical arm has an extendible arm joint that is operable to adjust a gap between the first and second flanges. The system includes a second mechanical arm disposed alongside the first and second flanges. The second mechanical arm has a first end retained on the first ring support structure and a second end retained on the second ring support structure. The second mechanical arm is in an opposed relation relative to the first mechanical arm. The second mechanical arm has an extendible arm joint that is operable to adjust the gap between the first and second flanges. The system includes a guide shaft that is coupled to the first ring support structure and the second ring support structure. The guide shaft is positioned to guide a relative movement between the first ring support structure and the second ring support structure during operation of the extendible arm joints of the first and second mechanical arms.

The first ring support structure of the system may include a first pipe clamp clamped around the first pipe and a first support collar disposed around the first pipe clamp. The first support collar may include apertures to receive the first ends of the first and second mechanical arms. The second ring support structure of the system may include a second pipe clamp clamped around the second pipe and a second support collar disposed around the second pipe clamp. The second support collar may include apertures to receive the second ends of the first and second mechanical arms.

Each of the extendible arm joints of the first and second mechanical arms of the system may include a linear actuator, which in some cases may be a pneumatic cylinder, a hydraulic cylinder, or a screw jack.

The guide shaft of the system may be rotatable relative to the first and second ring support structures. The system may include a tool arm coupled to the guide shaft and rotatable with the guide shaft. The system may include a line blind. The tool arm may be engageable with the line blind and rotatable to move the line blind in and out of the gap between the first and second flanges. The tool arm may be engageable with the line blind, for example, by inserting the tool arm through an aperture in the line blind or by engaging clamp or gripping elements carried by the tool arm with the line blind.

The guide shaft of the system may be resiliently coupled to the first ring support structure and the second ring support structure to permit adjustment of an axial position of the guide shaft in response to the relative movement between the first ring support structure and the second ring support structure.

The system may include a plurality of alignment spacers positioned on the first and second mechanical arms and the guide shaft. Each alignment spacer may be adjustable in a transverse direction to the tool axis.

The system may include a plurality of removable fasteners coupling the first and second flanges together.

In a third summary example, a method includes positioning a first flange of a first pipe in opposing relation to a second flange of a second pipe, clamping a first ring support structure around the first pipe, and clamping a second ring support structure around the second pipe. The method includes disposing a first mechanical arm alongside the first and second flanges and coupling the first mechanical arm to the first ring support structure and the second ring support structure. The method includes disposing a second mechanical arm alongside the first and second flanges and coupling the second mechanical arm to the first ring support structure and the second ring support structure. The method includes operating extendible arm joints in the first and second mechanical arms to adjust a gap between the first and second flanges.

The method may include disposing a guide shaft alongside the first and second flanges and coupling the guide shaft to the first ring support structure and the second ring support structure. Operating the extendible arm joints in the first and second mechanical arms to adjust the gap between the first and second flanges may include guiding a relative movement between the first ring support structure and the second ring support structure by the guide shaft.

The method may include coupling a tool arm to the guide shaft, engaging the tool arm with a line blind, and rotating the tool arm to swing the line blind in at least one of a first direction to remove the line blind from the gap between the first and second flanges and a second direction to position the line blind in the gap between the first and second flanges.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

A tool that may be used to manage flanges safely and in a cost and time effective manner is described herein. The tool may be clamped near the ends of pipes carrying flanges. The tool may be expanded after loosening the flange bolts to enable provision of services to the flanges and any safety devices used with the flanges. Examples of such services include, but are not limited to, replacing the flange, changing a flange gasket, swinging a line blind, and inspecting and optionally replacing a line blind. In some cases, the tool provides a platform for attachment of other accessories that may be useful in handling heavy blinds. As an example, a pulling chain may be fixed to the tool to enable lifting of a heavy blind with a forklift.

Figure 1:
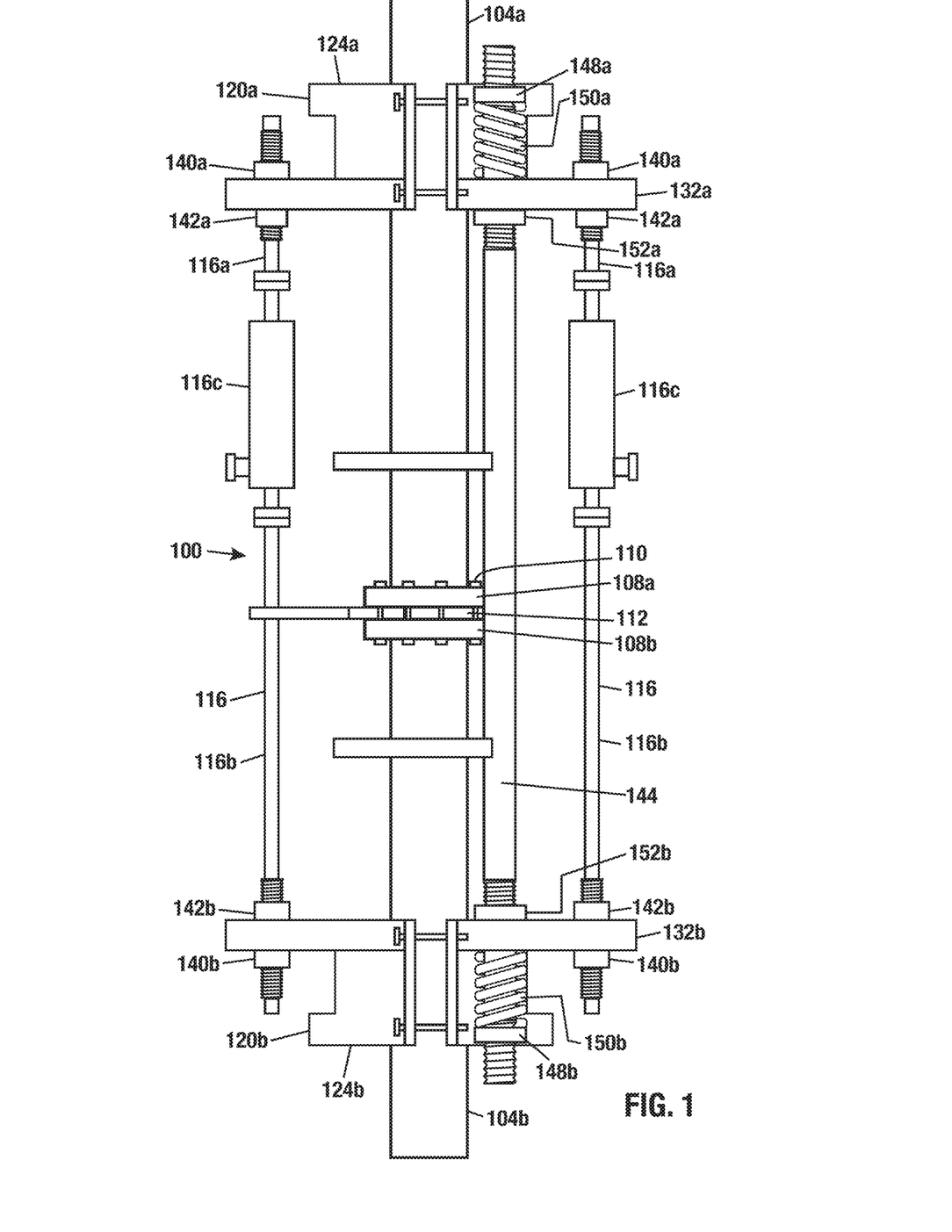
FIG. 1 is a schematic diagram of a tool for managing flanges positioned on pipes with flanges.
Figure 2:
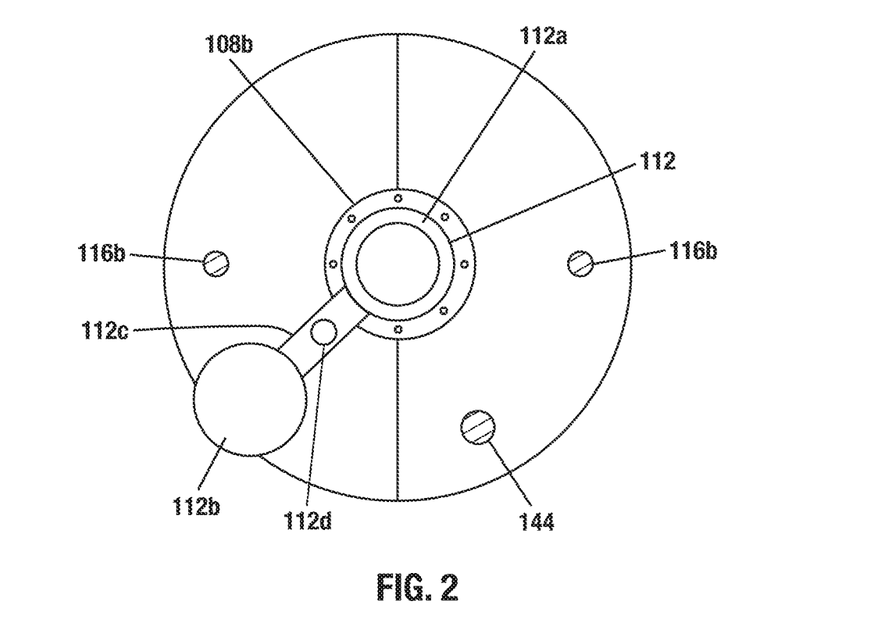
FIG. 2 is a cross-sectional view of the system shown in FIG. 1.

FIG. 1 shows an illustrative implementation of a tool 100 that can be used to manage flanges safely during installation and dismantling of flanges. Tool 100 is shown in an example environment including pipes 104a, 104b with flanges 108a, 108b. In the state illustrated in FIG. 1, flanges 108a, 108b are in opposing relation and held together by bolts 110. In addition, a spectacle blind 112 is inserted between flanges 108a, 108b. In one example, as shown more clearly in FIG. 2, spectacle blind 112 includes a ring disc 112a and a solid disc 112b connected together by a web of material 112c. When ring disc 112a is aligned with flanges 108a, 108b (in FIG. 1), free flow of material between pipes 104a, 104b (in FIG. 1) can occur through the ring disc. When solid disc 112b is aligned with flanges 108a, 108b, flow between pipes 104a, 104b will be blocked. There are other examples of line blinds besides a spectacle blind that could be inserted between flanges 108a, 108b, such as paddle blind, skillet blind, spade blind, and orifice plate. To take advantage of tool 100 in handling line blinds, the line blind to be installed or removed may have an aperture to receive a tool arm or a clamping area that can be engaged by a tool arm. Preferably, the aperture is in a part of the line blind that will protrude from the flanges when the line blind is inserted between the flanges. An example of an aperture to receive a tool arm is shown at 112d in FIG. 2 for spectacle blind 112.

Figure 3:
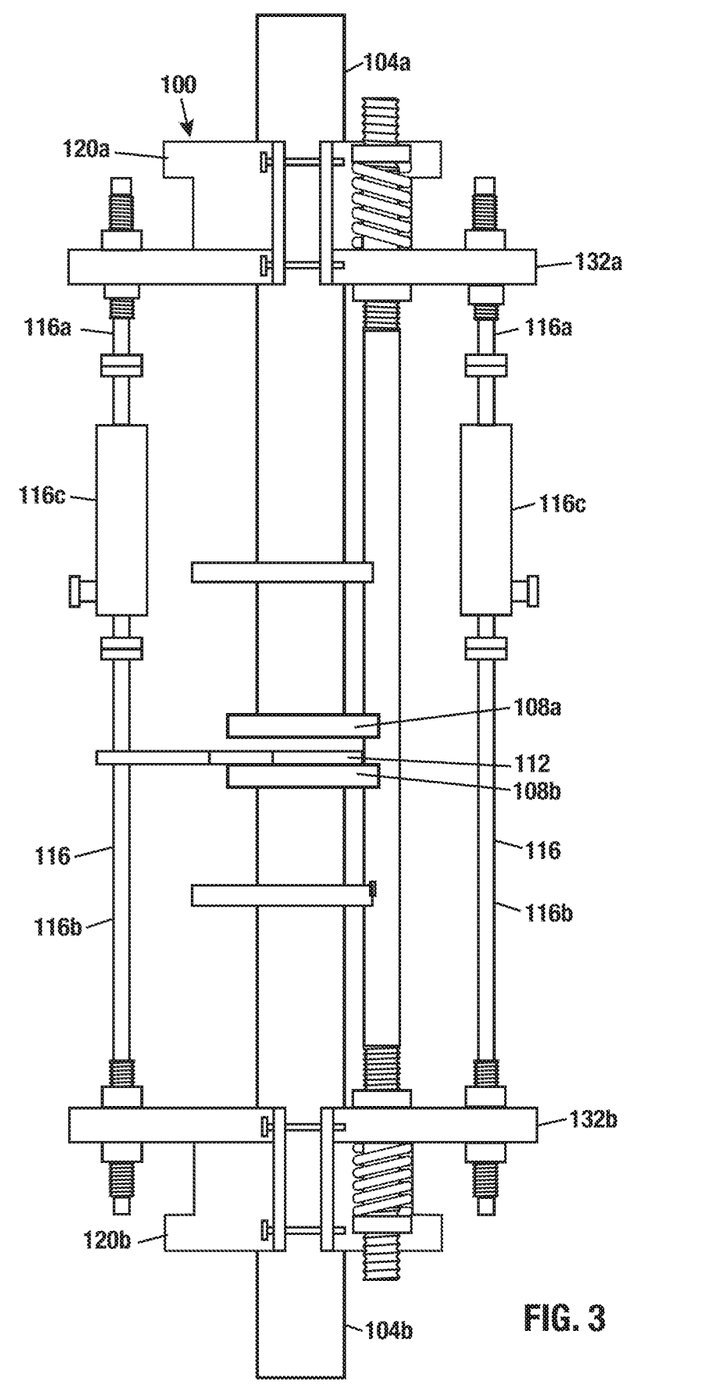
FIG. 3 is a schematic diagram showing the tool of FIG. 1 in an expanded state.

Returning to FIG. 1, tool 100 has a tool axis that extends in the same general direction as the axial axes of pipes 104a, 104b. Tool 100 includes two or more mechanical arms 116. Each mechanical arm 116 is an elongated structure including bars 116a, 116b coupled to opposite ends of an expander 116c. Bars 116a, 116b may have any suitable cross-sectional shape, such as circular, T-shape, I-shape, hexagon, and the like. Each expander 116c may be any linear actuator, such as a pneumatic, hydraulic, or screw jack. Expanders 116c form extendible arm joints in mechanical arms that allow expansion of mechanical arms 116 after tool 100 is clamped to pipes 104a, 104b. In the illustrated example, mechanical arms 116 are coupled to ring support structures 120a, 120b, which are installed on pipes 104a, 104b. Ring support structures 120a, 120b position mechanical arms 116 around flanges 108a, 108b and generally in parallel to pipes 104a, 104b. Ring support structures 120a, 120b position mechanical arms 116 in spaced apart relation around flanges 108a, 108b. In the case where tool 100 includes two mechanical arms 116, for example, the two mechanical arms 116 may be diametrically opposed across flanges 108a, 108b. In general, mechanical arms 116 may be evenly distributed around flanges 108a, 108b. In an example use of tool 100, the bolts holding flanges 108a, 108b can be loosened, and the gap between flanges 108a, 108b can be adjusted by operating expanders 116c to extend mechanical arms 116, as shown in FIG. 3.

Figure 4A:
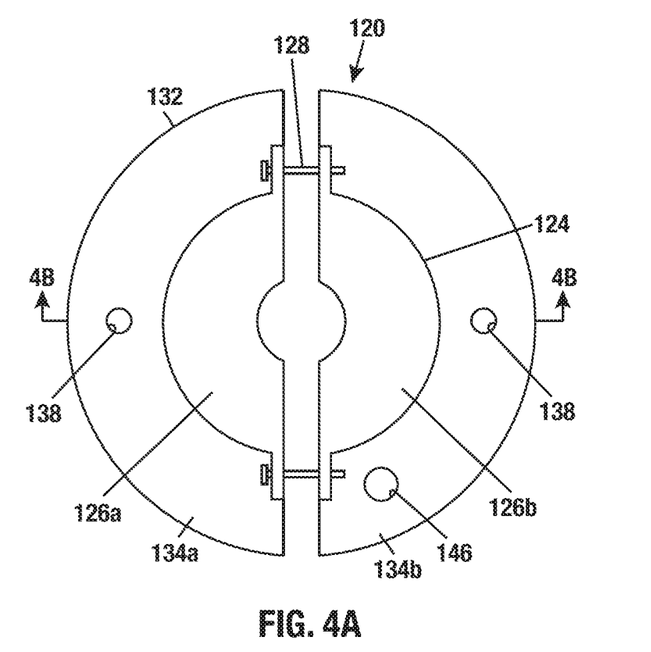
FIG. 4A is a plan view of a ring support structure of the tool of FIG. 1.
Figure 4B:
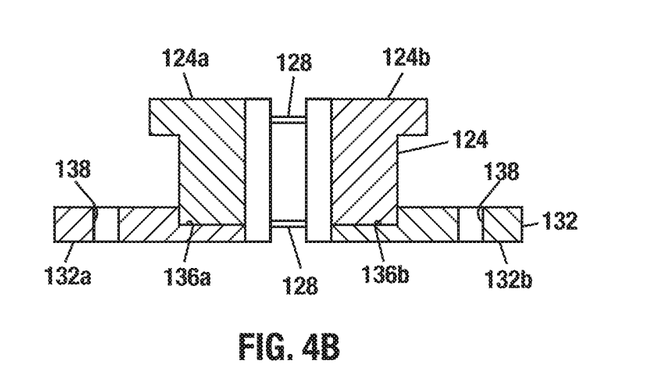
FIG. 4B is a cross-sectional view of FIG. 4A along line 4B-4B.

Each of ring support structures 120a, 120b may have the ring support structure 120 shown in FIGS. 4A and 4B. As shown, ring support structure 120 includes a pipe clamp 124 that can be fitted tightly around a pipe. Each pipe clamp 124 may have clamp halves 126a, 126b that together form a ring pattern around a pipe. Each pipe clamp 124 may have closure elements 128, such as fasteners, to hold clamp halves 126a, 126b together and tightly against a pipe. Ring support structure 120 includes a support collar 132 fitted around pipe clamp 124. In one example, support collar 132 has collar halves 134a, 134b corresponding to clamp halves 126a, 126b. Collar halves 134a, 134b may have recesses 136a, 136b (in FIG. 4B0 to receive and mate with end portions of clamp halves 126a, 126b. In one example, collar halves 134a, 134b are integrally formed with clamp halves 126a, 126b or otherwise permanently attached to clamp halves 126a, 126b, for example, by seam welds. In another example, collar halves 134a, 134b may be attached to clamp halves 126a, 126b by removable fasteners. In this other example, the same support collar 132 can be used with different pipe clamps 124 designed to engage different pipe sizes. In addition, when support collar 132 and pipe clamp 124 are separate pieces, there is the possibility of permanently installing a pipe clamp on each pipe and subsequently attaching the support collar to the pipe clamp when a service is to be formed on a flange of the pipe with tool 100.

Returning to FIG. 1, pipe clamps 124a, 124b of ring support structures 120a, 120b are fitted tightly around pipes 104a, 104b. Bars 116a of mechanical arms 116 are inserted into respective holes (138 in FIGS. 4A and 4B) in support collar 132a. Bars 116a may be retained on support collar 132a by, for example, nuts 140a. Similarly, bars 116b of mechanical arms 116 are inserted into respective holes (138 in FIGS. 4A and 4B) in support collar 132b. Bars 116b may be retained on support collar 132b by, for example, nuts 140b. Additional nuts 142a, 142b, or other types of lockers (e.g., slider locker or pinhole locker), may be used to lock bars 116a, 116b to support collars 132a, 132b as needed, e.g., when the mechanical arms 116 are in an expanded state and there is a possibility that expanders 116c may fail. Tool 100 may include a guide shaft 144 to guide extension/retraction of mechanical arms 116 and relative movement between ring support structures 120a, 120b as a result of extension/retraction of mechanical arms 116 during operation of expanders 116c. Guide shaft 144 is installed on support structures 120a, 120b and positioned to be generally parallel to mechanical arms 116. In one example, one end of guide shaft 144 is inserted into a respective hole (146 in FIGS. 4A and 4B) in support collar 132a, and the other end of guide shaft 144 is inserted into a respective hole (146 in FIGS. 4A and 4B) in support collar 132b. Guide shaft 144 may be retained on support collars 132a, 132b by, for example, nuts 148a, 148b and springs 150a, 150b. Springs 150a, 150b will allow the length of guide shaft 144 between support collars 132a, 132b to be adjustable. Additional nuts 152a, 152b, or other types of lockers, may be used to lock guide shaft 144 to support collars 132a, 132b as needed.

Figure 5:
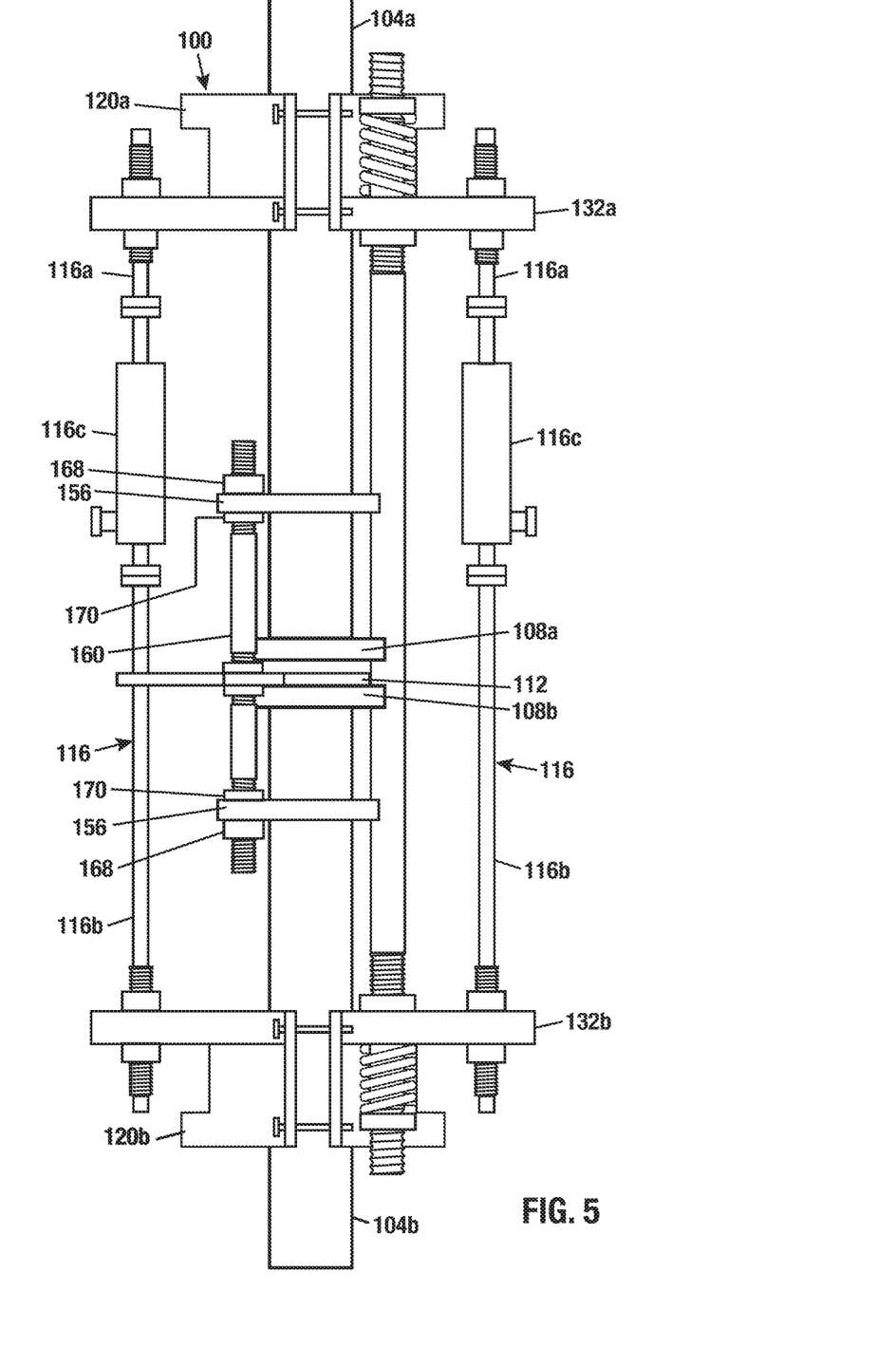
FIG. 5 is a schematic diagram of the tool of FIG. 1 with a tool arm for handling a line blind.

Referring to FIG. 5, tool 100 may include a tool arm 160 that may be used to safely remove and reinstate a blind. Tool arm 160 is fixed to guide shaft 144 to allow tool arm 160 and guide shaft 144 to rotate together. In the illustrated example, two support arms 156 are attached to guide shaft 144 at axially spaced apart positions. Support arms 156 include holes that may be aligned with an aperture in spectacle blind 112 by rotating guide shaft 144 about its axial axis. Tool arm 160 may be a rod that is inserted through the holes (161 in FIG. 6A) in support arms 156 and the aperture in spectacle blind 112. Holes (161 in FIG. 6A) in support arms 156 may be slots that allow the position of tool arm 160 along support arms 156 to be adjustable. Tool arm 160 may be retained on support arms 156 by nuts 168, 170 or other suitable fasteners. In addition, tool arm 160 may be secured to spectacle blind 112 by suitable fasteners. Alternatively, tool arm 160 may have two arm pieces with each arm piece carrying half of a clamp to engage spectacle blind 112.

Figure 6A:
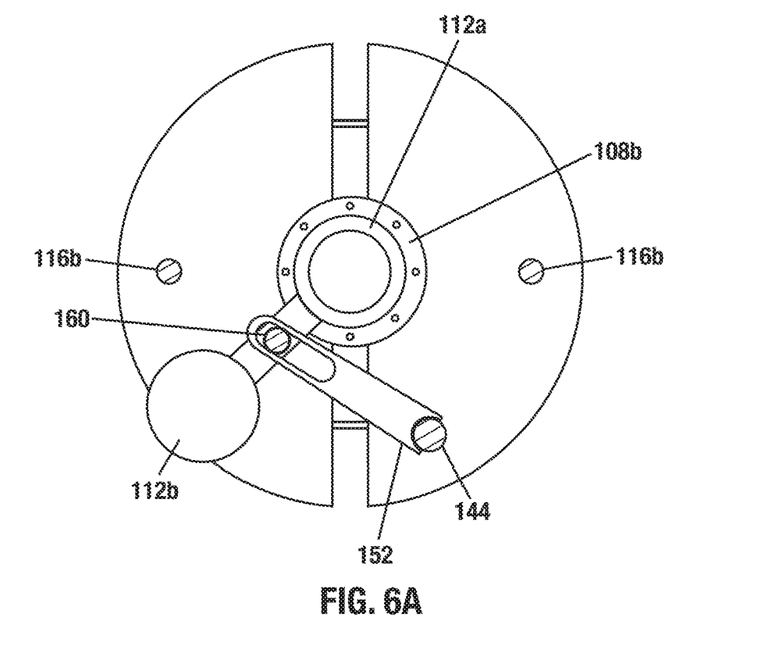
FIGS. 6A-6D are cross-sectional views of the system shown in FIG. 5 and illustrate a sequence of actions to handle a line blind.
Figure 6B:
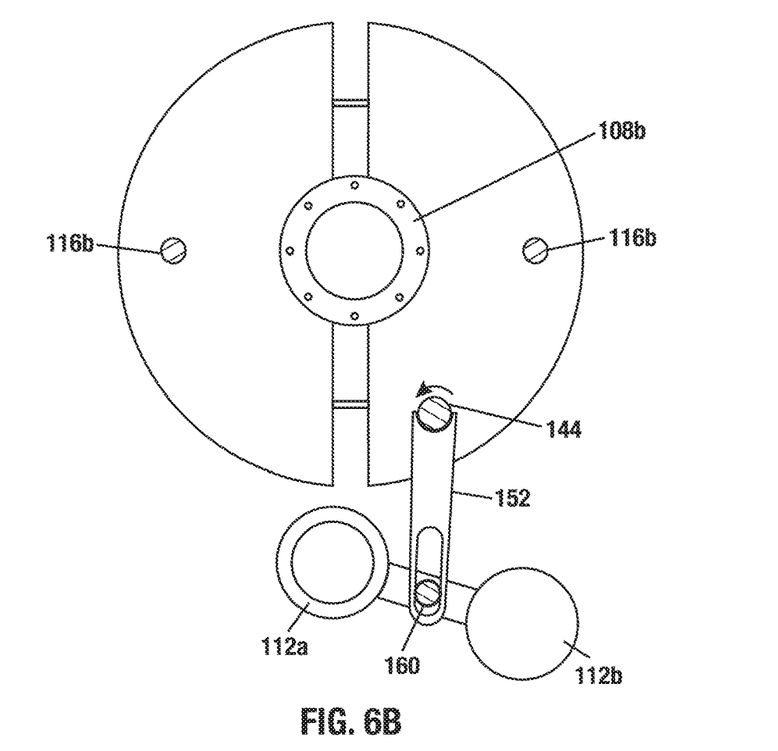
Figure 6C:
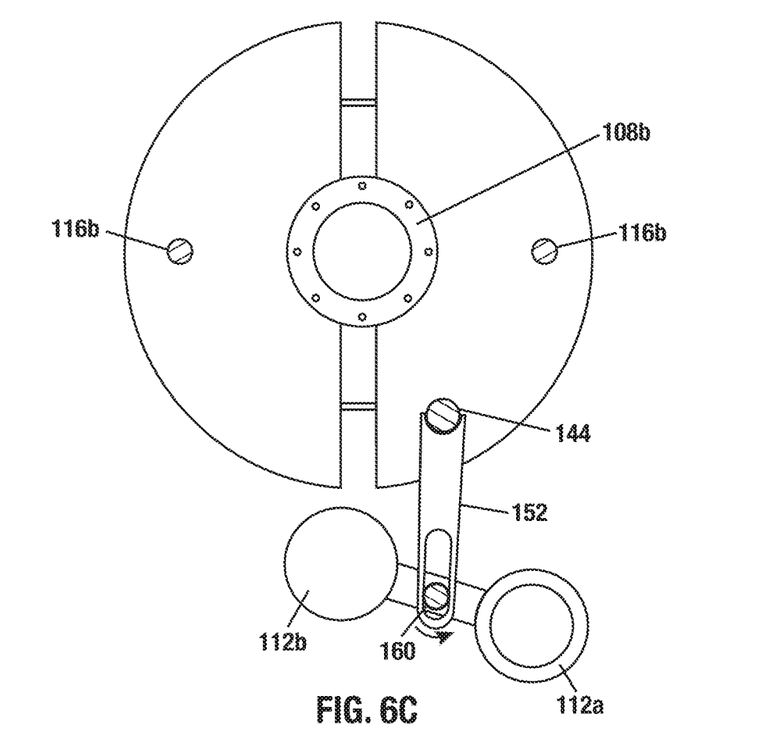
Figure 6D:
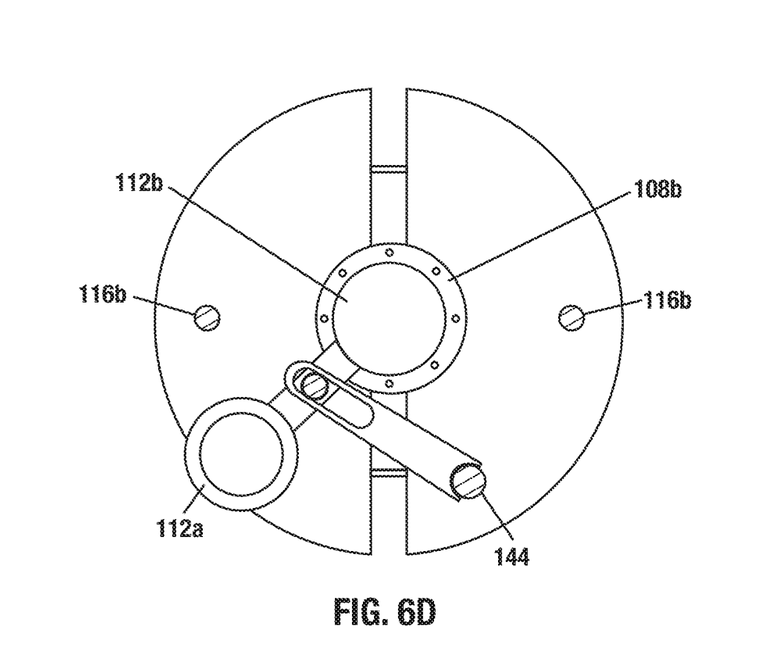

FIGS. 6A-6D show a sequence of actions to remove and reinstate spectacle blind 112. In FIG. 6A, ring disc 112a of spectacle blind 112 is positioned over flange 108b. Tool arm 160 is engaged with spectacle blind 112 and coupled to guide shaft 144. In FIG. 6B, guide shaft 144 is rotated to swing tool arm 160 and spectacle blind 112 out, resulting in removal of ring disc 112a from flange 108b. In FIG. 6C, spectacle blind 112 is rotated about tool arm 160 such that blind disc 112b can be positioned over flange 108b when spectacle blind 112 is swung back over flange 108b. In FIG. 6D, guide shaft 144 is rotated to swing tool arm 160 and spectacle blind 112 back, resulting in positioning of blind disc 112b over flange 108b. The sequence shown in FIGS. 6A-6D can be repeated to reinstate ring disc 112a in line with flange 108b.

Figure 7:
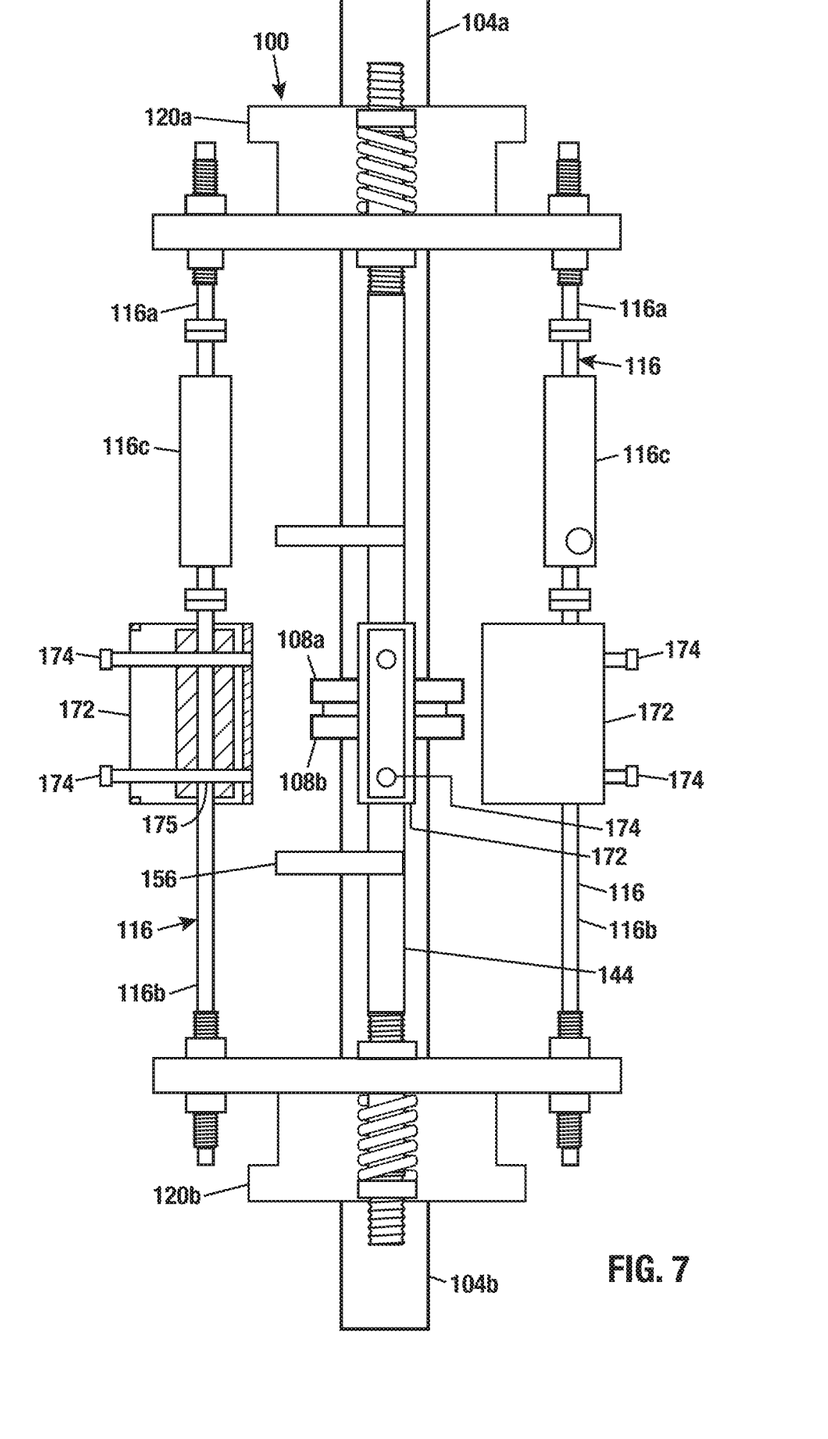
FIG. 7 is a schematic diagram of the tool of FIG. 1 with alignment spacers.

FIG. 7 shows tool 100 including alignment spacers 172 disposed around flanges 108a, 108b and adjustable to align flanges 108a, 108b. In the illustrated example, alignment spacers 172 are mounted on mechanical arms 116 and guide shaft 144 and are adjustable in a transverse direction relative to an axial axis of tool 100. Alignment spacers 172 may be adjusted by bolts or rods 174 that run through nuts (or threaded holes), illustrated at 175, in the respective mechanical arms 116 and guide shaft 144.

Figure 8:
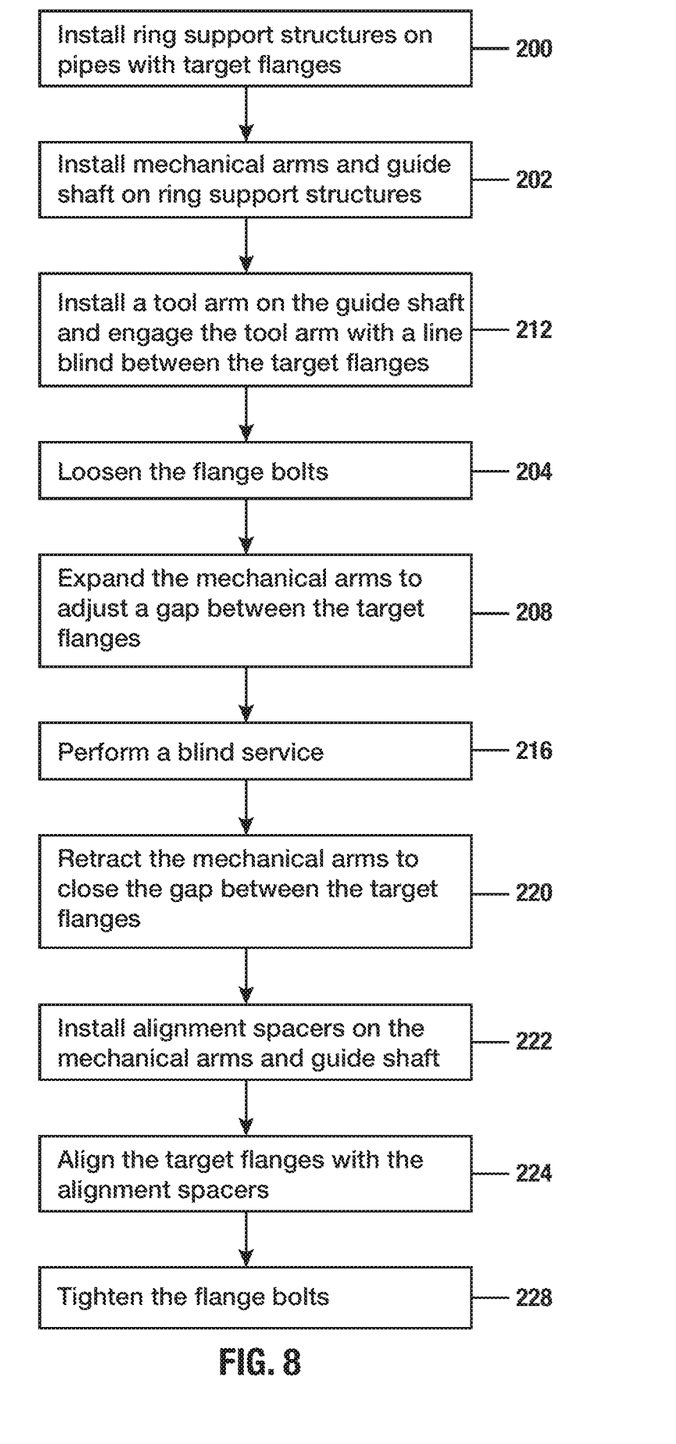
FIG. 8 is a flowchart illustrating a method of using the tool of FIGS. 1, 3, 5, and 7.

FIG. 8 is a flowchart illustrating a method of managing flanges using tool 100. At 200, the ring support structures of the tool are mounted on two pipes with two target flanges. The support structures are therefore axially spaced apart (shown at 108a, 108b in FIG. 1). At 202, the mechanical arms and guide shaft of the tool are installed on the ring support structures (shown at 116, 144 in FIG. 1). At 212, the tool arm is installed on the guide shaft and engaged with a line blind between the target flanges (shown in FIG. 5). If the target flanges are held together by bolts, then, at 204, the bolts are loosened. At 208, the mechanical arms are expanded to create a gap between the target flanges (shown in FIG. 3). The mechanical arms are expanded by operating the expanders in the mechanical arms. In some cases, operation of the expanders may be controlled by a computer. At 216, a blind service is performed. In one example, the line blind is a spectacle blind and the service performed is to change the spectacle blind from an open position to a closed position (or from a closed position to an open position). The service may be performed according to the sequence of actions shown in FIGS. 6A-6D. At 220, the expanders in the mechanical arms are released, closing the gap between the target flanges. Optionally, at 222, alignment spacers may be installed on the mechanical arms and the guide shaft (shown in FIG. 7). At 224, the flanges may be aligned with the aid of the alignment spacers. At 228, the bolts are tightened to secure the target flanges together. A similar procedure may be used to perform other services, such as replacing a flange gasket, replacing a flange, and replacing a safety device.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. An apparatus comprising:
a first ring support structure disposed along a tool axis;
a second ring support structure disposed along the tool axis and spaced apart from the first ring support structure along the tool axis;
a first mechanical arm having a first end retained on the first ring support structure and a second end retained on the second ring support structure, the first mechanical arm having an extendible arm joint that is operable to adjust an axial distance between the first ring support structure and the second ring support structure from a first location;
a second mechanical arm having a first end retained on the first ring support structure and a second end retained on the second ring support structure, the second mechanical arm having an extendible arm joint that is operable to adjust the axial distance between the first ring support structure and the second ring support structure from a second location that is different from the first location; and
a guide shaft coupled to the first ring support structure and the second ring support structure, the guide shaft positioned to guide a relative movement between the first ring support structure and the second ring support structure during operation of the extendible arm joints of the first and second mechanical arms, wherein the guide shaft is rotatable relative to the first and second ring support structures; and
a tool arm coupled to the guide shaft and rotatable with the guide shaft.

2. The apparatus of claim 1, wherein the second ring support structure comprises a pipe clamp and a support collar disposed around the pipe clamp, the support collar comprising apertures to receive the second ends of the first and second mechanical arms.

3. The apparatus of claim 1, wherein each of the extendible arm joints of the first and second mechanical arms comprises a linear actuator.

4. The apparatus of claim 3, wherein the linear actuator is a pneumatic cylinder, a hydraulic cylinder, or a screw jack.

5. The apparatus of claim 1, wherein the guide shaft is resiliently coupled to the first ring support structure and the second ring support structure to permit adjustment of an axial position of the guide shaft in response to the relative moment between the first ring support structure and the second ring support structure.

6. The apparatus of claim 1, further comprising a plurality of alignment spacers positioned on the mechanical arms and guide shaft, each alignment spacer adjustable in a transverse direction to the tool axis.

7. A system comprising:
a first pipe having a first flange;
a second pipe having a second flange positioned in opposing relation to the first flange;
a first ring support structure disposed around the first pipe;
a second ring support structure disposed around the second pipe;
a first mechanical arm disposed alongside the first and second flanges, the first mechanical arm having a first end retained on the first ring support structure and a second end retained on the second ring support structure, the first mechanical arm having an extendible arm joint that is operable to adjust a gap between the first and second flanges;
a second mechanical arm disposed alongside the first and second flanges, the second mechanical arm having a first end retained on the first ring support structure and a second end retained on the second ring support structure, the second mechanical arm in an opposed relation relative to the first mechanical arm, the second mechanical arm having an extendible arm joint that is operable to adjust the gap between the first and second flanges; and a guide shaft coupled to the first ring support structure and the second ring support structure, the guide shaft positioned to guide a relative movement between the first ring support structure and the second ring support structure during operation of the extendible arm joints of the first and second mechanical arms, wherein the guide shaft is rotatable relative to the first and second ring support structures, and further comprising a tool arm coupled to the guide shaft and rotatable with the guide shaft.

8. The system of claim 7, wherein the first ring support structure comprises a first pipe clamp clamped around the first pipe and a first support collar disposed around the first pipe clamp, the first support collar comprising apertures to receive the first ends of the first and second mechanical arms.

9. The system of claim 8, wherein the second ring support structure comprises a second pipe clamp clamped the second pipe and a second support collar disposed around the second pipe clamp, the second support collar comprising apertures to receive the second ends of the first and second mechanical arms.

10. The system of claim 7, wherein each of the extendible arm joints of the first and second mechanical arms comprises a linear actuator.

11. The system of claim 7, further comprising:
a line blind,
wherein the tool arm is insertable through an aperture in the line blind and rotatable to move the line blind in and out of the gap between the first and second flanges.

12. The system of claim 7, wherein the guide shaft is resiliently coupled to the first ring support structure and the second ring support structure to permit adjustment of an axial position of the guide shaft in response to the relative movement between the first ring support structure and the second ring support structure.

13. The system of claim 7, further comprising a plurality of alignment spacers positioned on the first and second mechanical arms and the guide shaft, each alignment spacer adjustable in a transverse direction to the tool axis.

14. The system of claim 7, further comprising a plurality of removable fasteners coupling the first and second flanges together.

* * * * *